United States Patent [19]

Wirth

[11] 3,993,151
[45] Nov. 23, 1976

[54] MASS AND FORCE METER

[75] Inventor: Armin Wirth, Zurich, Switzerland

[73] Assignee: Wirth, Gallo and Company, Switzerland

[22] Filed: Dec. 22, 1975

[21] Appl. No.: 642,919

[30] Foreign Application Priority Data

Mar. 19, 1975 Switzerland.......................... 3694/75

[52] U.S. Cl. .............................. 177/255; 73/141 R
[51] Int. Cl.² ............................................ G01L 1/00
[58] Field of Search........... 73/141 R; 177/134, 135, 177/256, 255

[56] References Cited
UNITED STATES PATENTS

| | | | |
|---|---|---|---|
| 2,934,092 | 4/1960 | Saunders...................... | 73/141 R X |
| 3,526,287 | 9/1970 | Flinth........................... | 73/141 R X |
| 3,915,248 | 10/1975 | Paelian ......................... | 177/255 X |

Primary Examiner—Jerry W. Myracle
Attorney, Agent, or Firm—Stevens, Davis, Miller & Mosher

[57] ABSTRACT

A mass and force meter comprising a frame, a load support, a measuring system, stops on the frame and on the load support, guides for vertically and parallel guiding the load support, at least one measuring cell in the measuring system, supporting elements mounted between the load and the measuring cell and transmitting to the cell substantially vertical forces only, one of the guides being elastically deformable under the action of horizontal forces acting on the load support, the elastic deformability of the guide increasing abruptly for a pre-determined value of the horizontal forces, the stops limiting the horizontal movement of the load support under the action of the horizontal forces exceeding the pre-determined value.

1 Claim, 17 Drawing Figures

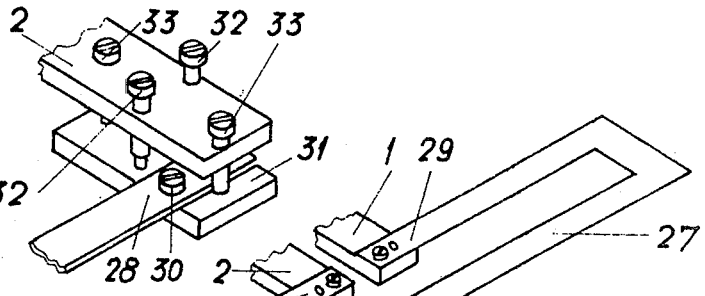
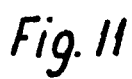
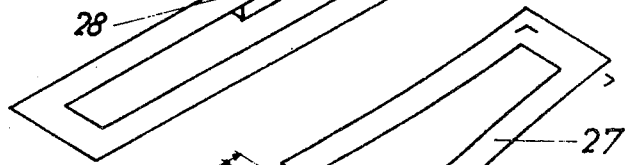
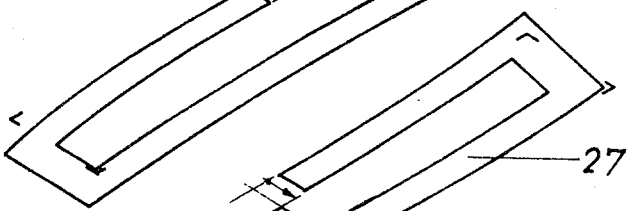
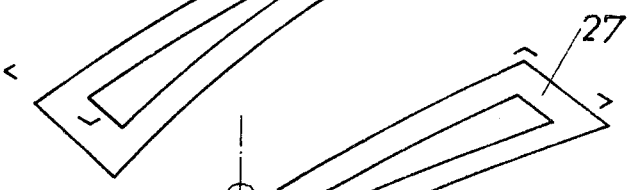
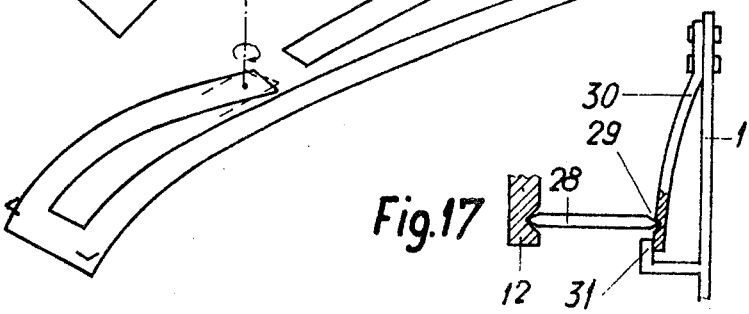

MASS AND FORCE METER

The present invention relates to a mass and force meter device with a frame, a load-support, guides for parallel guiding of the load support and a measuring system.

Such mass and force meters of this type are described in U.S. Pat. No. 3,423,999, in which the value of the mass or force to be measured is determined by means of vibrating strings. As described in U.S. Pat. No. 2,793,851 the measuring system can also consist in four force measuring cells on which the load support rests directly. In U.S. Pat. No. 2,652,241 the load support rests on hydraulic force measuring cells. The load support can also rest on a lever system connected with a single force-measuring cell of any kind or with a manual weighing device. Swiss Pat. No. 251.434 shows such a load support guided by horizontal guides.

If such devices are used, e.g. as mass-measuring devices, i.e. as balances, it is not only desirable but sometimes even necessary, e.g. for movable or frequently displaced balances, to measure correctly even in an oblique position without needing adjusting means for levelling. The administration demands that, when there are no special controlling or adjusting means for oblique position, such balances indicate correctly up to 5% in an oblique position.

Generally the load support of balances rests on supporting elements which, when the balance is levelled, transmit only vertical forces to the measuring system. At an oblique position the force to be measured, e.g. the weight of the mass to be determined, is decomposed into two components: a substantially vertical main component transmitted to the measuring system, and a component orthogonal to it, i.e. a substantially horizontal one. Furthermore, such horizontal forces can appear in the normal position for other reasons, too. If a vehicle with rubber tyres is driven on to the load support, it causes considerable horizontal braking forces, e.g. up to the amount of the force to be measured.

These horizontal forces or components of the force are transmitted to the frame by special elements. These elements should not influence the measurement neither in an oblique position nor in normal position. They should not cause friction between the frame and the load support. Furthermore, their cost must be reasonable in proportion to the cost of the whole installation.

As mentioned above, it is already known to provide horizontal guides mounted in different directions between the load support and the frame. Because of the differences in the thermal dilatation, of variations in the dimensions of the load support under load, of assembling imprecision, etc., it is necessary to mount these guides in such a way that there is some play between the load support and the frame.

When the load support has some play and when the balance is disposed horizontally, the guides are unloaded during the weighing, and therefore no particular quality of the joints and no particular horizontal orientation of the guides are needed. Without a play, disturbing weighing errors could appear because of undetermined forces, even if the fitting is very accurate and the joints have little friction.

On the other hand, a play has unpleasant consequences. The load support needs some time to come to a rest necessary for weighing which slows down the weighing process. Furthermore, in the case of abrupt braking forces, the whole load support can be accelerated and be pushed against the frame with great force. Then forces greater than the braking forces themselves can appear in the guides.

It is an object of the invention to provide an economically producible mass and force meter of the kind described above, which indicates correctly even in an oblique position and where in the weighing position, the load support is guided vertically with a small play or without any play relatively to the frame, so that horizontal forces or shocks can act on the load support without damage.

It is another object of the invention to provide a mass and force meter comprising a frame, a load support, a measuring system, stops on the frame and on the load support, guides for vertically and parallel guiding said load support, at least one measuring cell in said measuring system, supporting elements mounted between said load and said measuring cell and transmitting to said cell substantially vertical forces only, at least one of said guides being elastically deformable under the action of horizontal forces acting on said load support, said elastic deformability of said guide increasing abruptly for a pre-determined value of said horizontal forces, said stops limiting the horizontal movement of said load support under the action of said horizontal forces exceeding said pre-determined value.

Conveniently this pre-determined value will be equal to a fraction, e.g. 1/20 to 1/10 of the maximum load. Thus the forces acting on the guides can never be greater than the pre-determined values. Consequently the links can be constructed lightly, therefore with little friction and can thus be produced economically.

As formerly used, the load support can also have a play relative to the frame. But it can be assembled without a play, too, or with a preload, the comparatively small horizontal forces not influencing the measuring result.

In both cases, with or without a play, correct weighing is possible even when the balance is in an oblique position.

In the accompanying drawing embodiments of the object of the invention are shown schematically.

Figure 3:
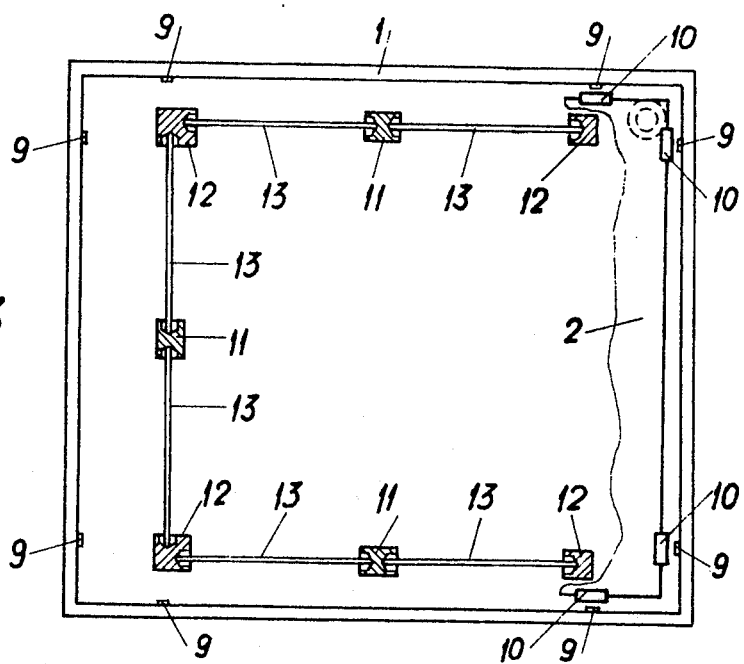
Figure 4:
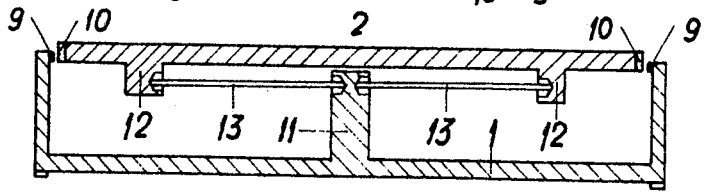
Figure 5:
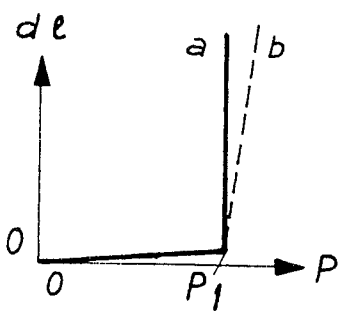
Figure 6:
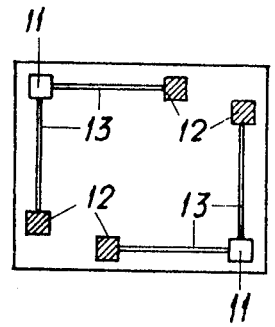
Figure 7:
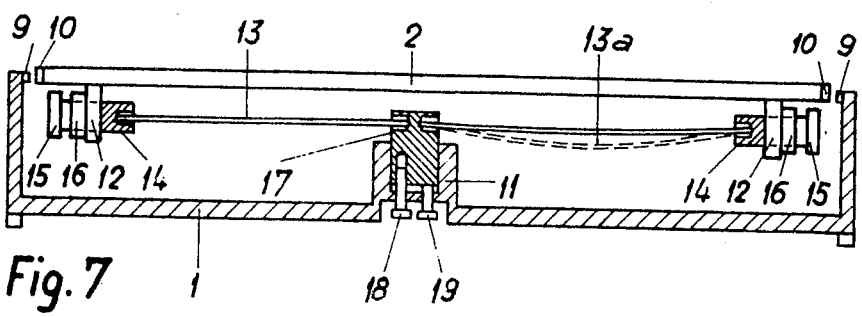

FIGS. 3, 4 are a plan view and in a vertical cross-section a meter with three pairs of guides, FIG. 5 is a force-way diagram, FIG. 6 is a variant to FIG. 3, FIG. 7 is a variant to FIG. 4, FIGS. 8–10 are each one a different embodiment of the guide, FIG. 11 is a further embodiment of a guide, FIG. 12 shows how this guide is fastened to the load-support, FIGS. 13–16 show various positions taken by the guide of FIG. 11, and FIG. 17 shows an elastic organ mounted on the frame.

Figure 1:
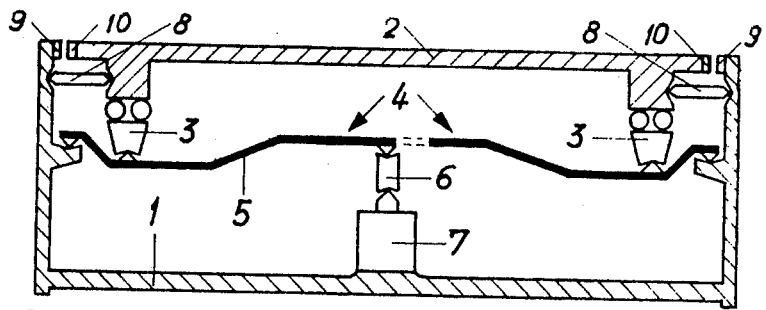
FIG. 1 is a vertical cross-section of a meter with one single measuring cell.

FIG. 1 represents schematically a meter in vertical cross-section, used as a mass-measuring device, i.e. as a balance. It has a frame 1 and a load support 2. The latter rests on a schematically represented lever system 4 of known construction by means of intermediate supporting elements 3. The load-lever 5 of this lever system 4 acts on one single force-measuring cell 7 by means of a supporting element 6. The supporting elements 3 and 6 are of known construction. They transmit only substantially vertical forces. The display device is not shown here. The supporting elements 3 and the lever system 4 form the measuring elements for horizontally and parallel guiding the load support 2. The guides 8 are guiding elements which prevent the load support 2 from moving horizontally, and which guide it vertically. These guides 8 are mounted between load support 2 and frame 1. Furthermore, stops 9 and 10 are provided on frame 1 and on load support 2.

Figure 2:
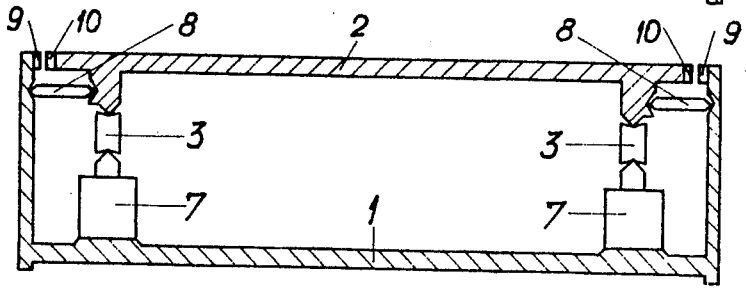
FIG. 2 is a vertical cross-section of a meter with four force-measuring cells.

FIG. 2 shows another balance in a schematical cross-section. Instead of the lever system 4 and a single force-measuring cell 7 it presents four measuring cells 7, whereon the load support 2 is resting by means of intermediate supporting elements 3.

FIGS. 3 and 4 show another balance. For the sake of simplicity, only frame 1 and load support 2 are represented. Supporting elements, lever system and force-measuring cell have been omitted. Frame 1 presents three brackets 11 and load support 2 has, on its lower side, four brackets 12. These brackets 11, 12 are provided with notches to receive six rods 13. These six rods 13 are mounted (FIG. 3) so, that they determine the position of the load support 2 in its horizontal plane. They are fitted into the notches of the brackets 11, 12 with a small play.

If the described balance is used e.g. for weighing vehicles, the braking of the vehicle driven on the balance causes horizontal forces. If these forces remain below a given value, they are transmitted to frame 1 by guides 8. But if these forces exceed a pre-determined value corresponding to the design of the balance, the elastic deformability of the guides 8 increases abruptly and the load support 2 can move horizontally, until its movement is stopped by the pairs of stops 9, 10. The particular configuration of the guides 8 or of their abutments permitting this effect is described below. If in the desired application such horizontal forces can appear in only one direction, it is sufficient to provide only one guide 8 or one of its abutments for abruptly increasing its elastic deformability.

In the so far explained examples rods 13 have a circular section and are so dimensioned that they buckle at a pre-determined value of the horizontal forces, e.g. 1/10 to 1/20 of the maximum load of the balance. The behaviour of these bars is schematically represented in FIG. 5. P is the increasing horizontal force resulting from an oblique position or from braking, $P_1$ is the pre-determined value and d1 the negative elongation of the rods 13. From this force-way diagram results that, as long as force P does not reach the value $P_1$, the length of the rods 13 variates only negligibly. When the value $P_1$ is reached, the elastic deformability of the rods 13 increases abruptly (branch $a$ of the curve), i.e. they buckle completely without further increase of the force. Then the load support 2 moves horizontally. This movement is limited by the stops 9, 10. The advantage of this configuration consists in that for great horizontal forces, guides 8 are short circuited. The impact of these forces is absorbed by the stops 9, 10. Thereby guides 8 are not damaged. They can re-assume their task as soon as the horizontal forces do not reach the value $P_1$ any longer. Also flat rods with convenient ends can be used.

FIG. 6 represents a variant of the configuration of the rods 13. It only implies that the frame as well as the load support are sufficiently stiff in diagonal direction.

The rods 13 can be fitted in with a small play as mentioned, i.e. with a play of few tenths of a millimeter. This entails that the load support has some horizontal mobility, too. Eventually this can slow down the weighing process. To avoid this, the rods 13 can be fitted in without any play, without creating by this a statically undefined system. The buckling force of each rod of a pair can be dimensioned differently. One rod will buckle e.g. at 1/10, the other one at 1/11 of the maximum load. This can be achieved by the fact that one rod of each pair, both having the same diameter, is 1/20 longer or, both having the same length, one is 1/40 thinner than the other.

The embodiment according to FIG. 7 is a variant of the one shown in Fig. 4, wherein means are provided for adjusting and fixing rods 13 horizontally and vertically. For that brackets 11 are provided with a bearing 17, an adjusting screw 18 and a fixing screw 19. One notch 14 receiving one end of the rod is provided in a bearing 15 which is adjustably mounted in bracket 12. Its position can be set with a nut 16. Furthermore, the play to the stops 9, 10 can be adjusted. The pair of rods 13, 13a can also be pre-loaded until the longer or the thinner rod 13a is slightly buckled. Bearings 17 serve for adjusting the rods 13 in a horizontal plane.

Figure 8:
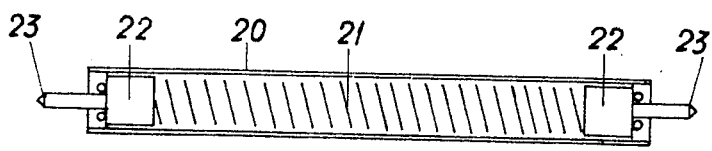
Figure 9:
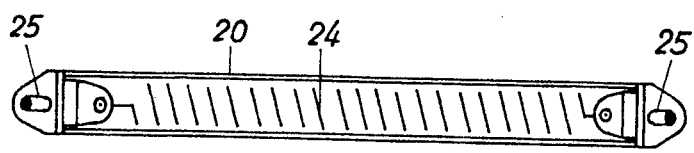
Figure 10:
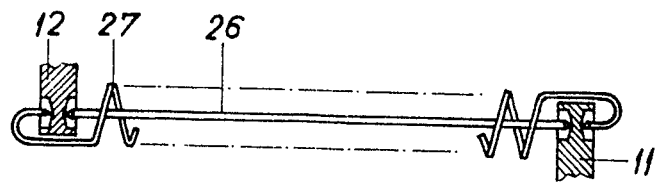

FIGS. 8–10 represent further embodiments of guides 8. The guide in FIG. 8 consists of a tube 20, in which a pressure spring 21 is mounted, which presses outwards two terminal pieces 22. These terminal pieces 22 bear pin-shaped joint-ends 23. The pre-load of the pressure spring can be chosen so that, reaching the critical value $P_1$ (FIG. 5) the deformability of the guide increases abruptly (branch $b$ in FIG. 5). While for a buckled rod this deformability increases infinitely, for a guide as shown in FIG. 8 it increases more slowly, but by far more rapidly than before reaching the value $P_1$. In the embodiment of FIG. 9 a draw spring 24 instead of a pressure spring is provided in tube 20, whose ends are fixed to ears 25 which are then fixed to brackets 11 or 12. This draw spring 24 is also adjusted to a pre-determined value. When this value is exceeded, the elastic deformability changes abruptly (behaviour as branch $b$ in FIG. 5). The guide represented in FIG. 10 reacts to traction as well as to pressure. It consists of a buckling pressure rod 26 fixed between brackets 11 and 12, and of a pre-loaded draw spring 27 also fixed to these brackets 11, 12. The tension of the draw spring 27 is suitably chosen equal to half the buckling force of the pressure rods 26. The abrupt deformability of the guide under traction or under pressure changes at the same, oppositely acting, critical value $P_1$. Only three suitably disposed guides of this kind are necessary to guide the load support in a horizontal plane.

FIGS. 11–16 represent a further embodiment of guide 8. The guide consists in a single, thin, flat, C-shaped element 27. Its end 28 is fixed to the load support 2 and its end 29 is fixed to the frame 1. FIG. 12 shows in detail the fastening to the load support 2. The end 28 of the element 27 is fixed on a small plate 31 by means of screws 30. This plate 31 is fixed to the load support 2 by two pressure screws 32 and two pulling screws 33. By screwing or unscrewing these screws, element 27 can be adjusted in such a way that no vertical forces are acting on it and that it is not in contact with the load support. Notice that one single guide of this kind is sufficient to determine the position of the load support in a horizontal plane. FIGS. 13–16 show the deformations of this element 27, which should remain within the limits of elasticity, after having exceeded the critical value at the presence of differently acting forces. The desired critical value is obtained choosing the flat element 27 of adequate thickness, adequate side length and leg length. Also other forms of thin elements being deflected from their original flat form at the critical value can be used. This kind of deflection is usually called tilting. The increase of the elastic deformability of such elements generally follow branch a of FIG. 5.

FIG. 17 shows an embodiment wherein an organ with abruptly increasing elastic deformability is fixed on the frame.

One end of a non buckling guide 28 is mounted in a notch 29 of a leaf spring 30, which is fixed under preload to the frame 1 and is pressed against a stop 31. When the force acting on guide 28 exceeds the critical value, it yields abruptly until the stops not represented here become effective. Of course, it is also possible to mount spring 30 and stop 31 on the load support 2 and not on the frame 1.

By a guide with abruptly increasing elasticity the guiding organ is to be understood, including its links, as well as its bearing on the frame and/or on the load support, as shown in FIG. 12 and FIG. 17.

I claim:

1. A mass and force meter comprising a frame, a load support, a measuring system, stops on the frame and on the load support, guides for vertically and parallel guiding said load support, at least one measuring cell in said measuring system, supporting elements mounted between said load support and said measuring cell and transmitting to said cell substantially vertical forces only, at least one of said guides being elastically deformable under the action of horizontal forces acting on said load support, said elastic deformability of said guide increasing abruptly for a pre-determined value of said horizontal forces, said stops limiting the horizontal movement of said load support under the action of said horizontal forces exceeding said pre-determined value.

* * * * *